(12) United States Patent
Alkabie

(10) Patent No.: US 7,302,802 B2
(45) Date of Patent: Dec. 4, 2007

(54) AERODYNAMIC TRIP FOR A COMBUSTION SYSTEM

(75) Inventor: Hisham Alkabie, Oakville (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 854 days.

(21) Appl. No.: 10/683,118

(22) Filed: Oct. 14, 2003

(65) Prior Publication Data

US 2006/0123793 A1 Jun. 15, 2006

(51) Int. Cl.
*F02C 1/00* (2006.01)
(52) U.S. Cl. .............................. 60/772; 60/751; 60/760
(58) Field of Classification Search ................. 60/751, 60/758, 760, 772, 804
See application file for complete search history.

(56) References Cited

U.S. PATENT DOCUMENTS

| | | | |
|---|---|---|---|
| 2,657,531 A | 10/1953 | Pierce | |
| 3,333,414 A | 8/1967 | Saintsbury | |
| 3,974,647 A | 8/1976 | Lewis et al. | 60/39.72 P |
| 4,122,674 A | 10/1978 | Andersson et al. | 60/39.65 |
| 4,380,895 A | 4/1983 | Adkins | |
| 4,531,356 A | 7/1985 | Linder | 60/39.02 |
| 4,606,721 A | 8/1986 | Livingston | 431/116 |
| 4,796,429 A | 1/1989 | Verdouw | |
| 5,353,598 A | 10/1994 | Huck et al. | 60/725 |
| 5,644,918 A | 7/1997 | Gulati et al. | 60/725 |
| 6,134,877 A * | 10/2000 | Alkabie | 60/800 |
| 6,164,058 A | 12/2000 | Döbbeling et al. | 601/39.36 |
| 6,272,842 B1 | 8/2001 | Dean | 60/39.23 |
| 6,430,933 B1 | 8/2002 | Keller | 60/772 |
| 6,464,489 B1 | 10/2002 | Gutmark et al. | 431/1 |
| 6,490,864 B1 | 12/2002 | Joos et al. | 60/725 |
| 6,494,044 B1 | 12/2002 | Bland | 60/772 |
| 6,546,729 B2 | 4/2003 | Hellat et al. | 60/725 |
| 6,568,190 B1 | 5/2003 | Tiemann | 60/804 |
| 6,681,578 B1 * | 1/2004 | Bunker | 60/772 |
| 6,826,913 B2 * | 12/2004 | Wright | 60/772 |

FOREIGN PATENT DOCUMENTS

EP 1426688 A1 6/2004
WO WO 02/095293 A1 11/2002

* cited by examiner

*Primary Examiner*—Charles G Freay
(74) *Attorney, Agent, or Firm*—Ogilvy Renault LLP

(57) ABSTRACT

A apparatus and method for improving combustion by improving at least one of temperature distribution in the combustor, pressure distribution around the combustor and combustion noise level in the combustor, by redistributing air around the combustor to modify the structure of the air flow prior to entry into the combustor.

24 Claims, 7 Drawing Sheets

AERODYNAMIC TRIP FOR A COMBUSTION SYSTEM

TECHNICAL FIELD

The present invention relates to a method and apparatus for improving combustion, and particularly gas turbine engine combustion.

BACKGROUND OF THE INVENTION

In the combustion of fuels in a combustion chamber like that of an industrial gas turbine or an aircraft gas turbine engine, the combustion process can cause instabilities or pressure fluctuations which, under unfavourable conditions, present undesirable combustion noise and a poor dynamic temperature distribution.

In particular, there is a need to improve temperature distribution and noise level of gas turbine engine combustion, and particularly so in APU for aircraft.

SUMMARY OF THE INVENTION

One object of the present invention is to provide improved combustion, and particularly that which would be beneficial to gas turbine engines.

In another aspect, the invention provides at least a gas turbine engine comprising: a combustor portion including at least one combustor, the combustor having a plurality, of holes therein for admitting combustion air into the combustor; a casing defining at least one chamber therein, the chamber containing the combustor and a volume of air around at least a portion of the combustor; a compressor portion communicating with the chamber via a compressor outlet for delivering compressed air to the chamber for subsequent admission into the combustor; and a ring extending into the chamber substantially continuously around the chamber so as to extend partially into an air flow exiting the compressor outlet into the chamber, the ring sized and positioned in the chamber to, in use, cause a step change in direction and pressure of at least a portion of the air flow, the step change adapted to effect a redistribution of air around the combustor to thereby achieve at least one of reduced combustion noise and more uniform temperature distribution in the combustor.

In another aspect, the invention provides at least an apparatus for improving combustion in a gas turbine engine, the gas turbine engine comprising at least a compressor portion, a combustor and a chamber housing the combustor, the compressor portion having an outlet interfacing with the chamber for delivering a flow of compressed air to the chamber, the combustor having holes therein interfacing with the chamber and adapted to permit air in the chamber to enter the combustor for combustion, the apparatus comprising: means positioned fluidly intermediate the outlet and the combustor for aerodynamically tripping the compressed air flow entering the chamber to thereby create a step change in the air flow prior to entry into the combustor, said means adapted to thereby decouple acoustic and hydraulic fluctuation components in the air flow prior to entry of the air flow into the combustor.

In another aspect, the invention provides at least a gas turbine engine comprising: a gas generator portion including at least a compressor, a combustor and a chamber around the combustor, the gas generator in use having an air flow from the compressor entering the chamber and guided thereby to the combustor; the air flow providing a source of combustion air to the combustor; and at least one trip disposed in the chamber at a location fluidly intermediate the compressor and the combustor, the trip adapted to extend into the air flow and extend substantially transversely relative to an initial direction of the air flow in the chamber, the trip adapted in use to create a predetermined step change increase in pressure drop of the air flow to thereby effect a predetermined air flow redistribution in the chamber, said air flow redistribution predetermined to improve at least one of an air pressure distribution outside the combustor and a fluctuation phase shift in the air flow adapted to reduce combustion noise.

In another aspect, the invention provides at least a method for improving at least one of a temperature distribution and a combustion noise level in a combustor of a combustion system, the combustion system having an air source for providing a flow of compressed air to a chamber housing the combustor, the combustor having holes therein for admitting the compressed air into the combustor for combustion therein when mixed with fuel and ignited, the method comprising the step of: aerodynamically tripping the flow of compressed air downstream of an entry point for said air into the chamber and before the flow of air enters the combustor, the step of tripping adapted to impart at least a step change in pressure drop of at least a portion of the flow of air, the step change adapted to decouple fluctuation components in the flow of air prior to entry of the air into the combustor.

In another aspect, the invention provides at least a method of providing a gas turbine engine, the method comprising the steps of: determining a configuration for a compressed air system, a combustor and a casing chamber surrounding the combustor, the configuration including an air flow path from compressed air system through the casing chamber and into the combustor; determining an initial operating air pressure distribution occurring in the compressed air in the chamber around the combustor; determining a desired air pressure redistribution in the compressed air in the chamber around the combustor, the redistribution adapted to provide at least one of reduced combustion noise and improved temperature distribution in the combustor; and introducing an intervention in the casing chamber, the intervention extending into the flow path and adapted to effect the determined air pressure redistribution.

In another aspect, the invention provides at least a method of improving combustion, the method comprising the steps of: providing a compressed air flow, the compressed air flow having an acoustic and hydrodynamic structure imposed during a compression process; restructuring the acoustic and hydrodynamic structure to provide a preselected second acoustic and hydrodynamic structure, the second structure preselected to cause a acoustic and hydrodynamic phase shift in at least a portion of the compressed air flow, the phase shift being selected adapted to reduce combustion noise; providing the restructured compressed air flow to a combustor for use in combustion.

In another aspect, the invention provides at least a method of improving combustion in a gas turbine engine, the method comprising, the steps of: selecting a gas turbine engine, the engine having at least a compressor providing a source of compressed air, a combustor and a chamber surrounding the combustor, the compressor, chamber and combustor in serial fluid communication for transmitting the air from the compressor to the combustor for combustion; and modifying the gas turbine engine by inserting at least one aerodynamic trip into the chambers the trip adapted to effect at least one of a pressure redistribution around the combustor and a phase shift in pressure fluctuations in at least a portion of the air in the chamber, the phase shift adapted to reduce combustion noise.

BRIEF DESCRIPTION OF THE DRAWINGS

Having thus generally described the nature of the present invention, reference will now be made to the accompanying drawings, showing by way of illustration the preferred embodiment thereof, in which.

DETAILED DESCRIPTION OF THE PREFERRED EMBODIMENTS

Figure 1:
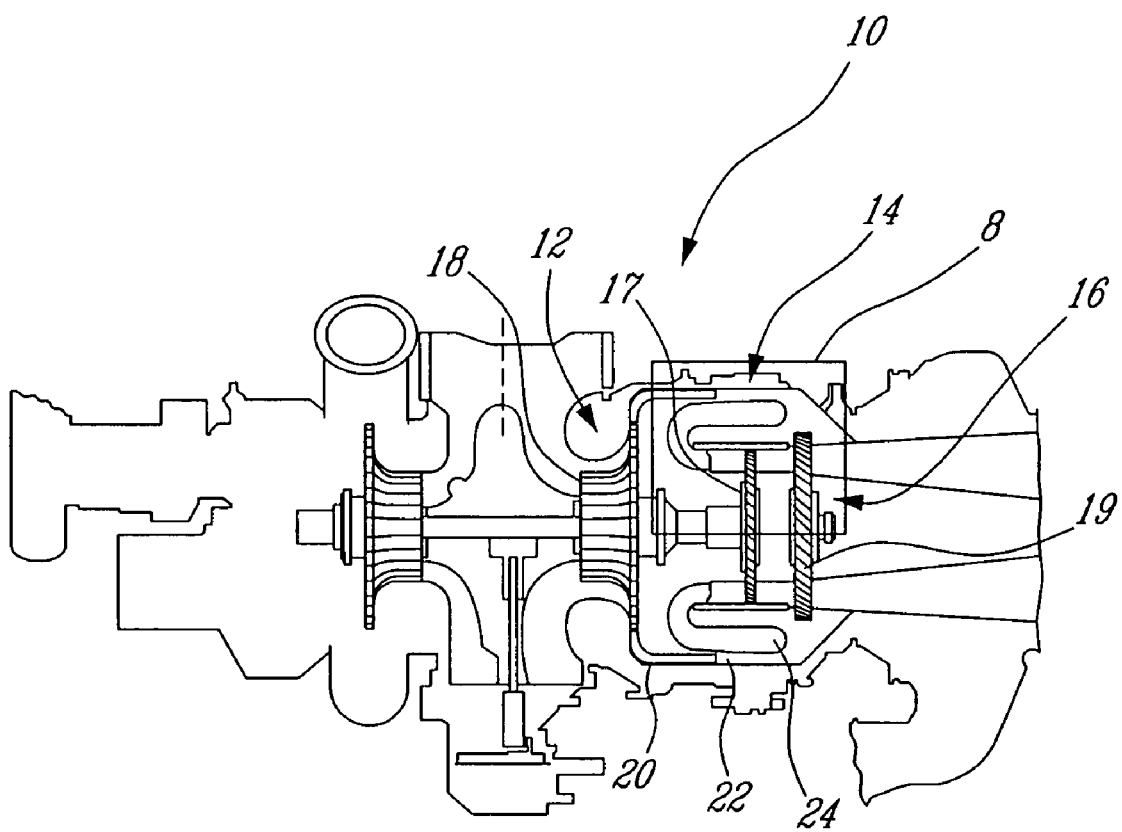
FIG. 1 is a schematic cross-sectional view of a gas turbine engine incorporating one embodiment of the present invention.

Referring to FIG. 1, a gas turbine engine 10, which is illustrated as an APU but can be any type of gas turbine engine, includes an embodiment of the present invention. Engine 10 generally comprises a compressor region 12, a combustor region 14 and a turbine region 16. The compressor region 12 generally includes a high pressure compressor 18 for providing a high pressure compressor air flow for combustion and for cooling of the engine. A compressor diffuser 20 is positioned downstream of the high pressure compressor 18 and extends into the combustor region 14 for reducing the velocity which increases the pressure of compressor air flow and for delivering the compressor air flow to the combustor region 14. According to the present invention, a tripping device, in this embodiment preferably an aerodynamic trip ring 22, is provided in the combustor region 14 for intervening in the compressor air flow before the compressor air flow enters a combustor 24 for combustion, as will be described in detail with reference to FIG. 2, below. The turbine region 16 includes high pressure turbine 17 and powering turbine 19. The combustion gases generated from the combustor region 14 enter the turbine region 16 for powering the respective turbines 17 and 19.

Figure 2:
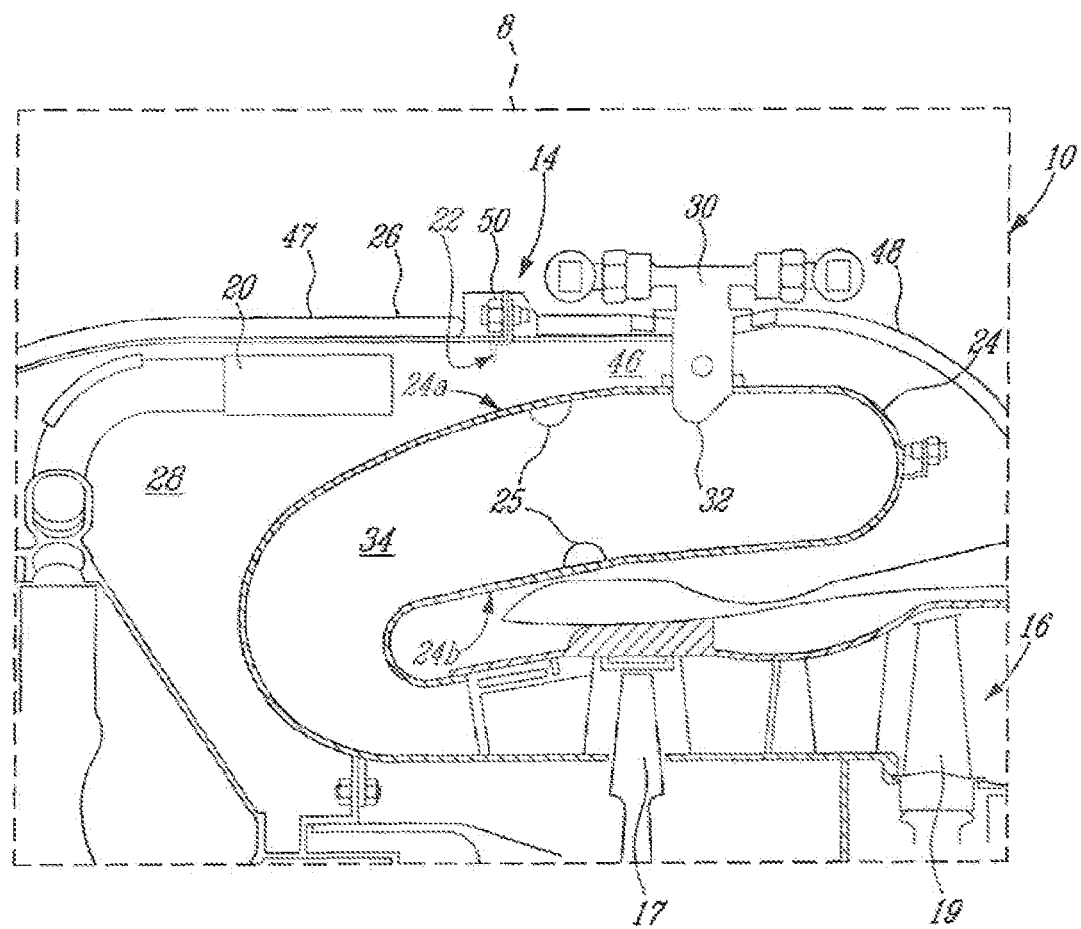
FIG. 2 is a cross-sectional view of Detail 8 of FIG. 1.

FIG. 2, taken from Detail 8 of FIG. 1, depicts the combustor region 14 in greater detail. Generally, the combustor region 14 is defined by a substantially cylindrical casing 26, preferably surrounding at least a downstream section of the compressor diffuser 20 and the combustor 24, (which is shown as an annular combustor, though any suitable combustor shape may be used), thereby forming a chamber 28 surrounding a volume of air and the combustor 24. The combustor 24 has a radially outer side 24a and a radially inner side 24b. The casing serves to help direct the compressor air flow from the compressor diffuser 20 to the combustor, and thereby defines a flow path portion 46 downstream of the compressor diffuser 20 to the combustor 24. The compressor 24 is supported within the chamber 28 by a suitable support structure 30 which secures the annular combustor 24 to the casing 26. A plurality of fuel nozzles 32 extend into the combustor 24. The combustor 24 further includes a plurality of apertures 25 therethrough so that the chamber 28 is in fluid communication with a combustor chamber 34 defined within the combustor 24. The fuel nozzles 32 inject fuel into the combustion chamber 34 to be mixed with compressor air flow having entered from the chamber 28 into the combustor 24. The fuel and air mixture is then ignited to generate expanding combustion gases, which then enter the turbine section 16 for driving the high pressure turbine 17 and the power turbine 19.

The compressor air flow exiting the compressor region generally carries fluctuation energy which is generated substantially during the air compressing course. The fluctuation energy carried in the compressor air flow includes both acoustic and hydraulic fluctuation components which present a broad band of high and low frequency signals. These high and low frequency signals when being delivered into the combustor 24 by the compressor air flow, will be amplified during the combustion reaction in the combustion chamber 34, thereby creating a high level of the combustion noise. Furthermore, the fluctuation energy carried and delivered into the combustor 24 by the compressor air flow, adversely affects an even and uniform pressure distribution, which causes the less than optimum mixing of fuel with the compressor air flow within the combustor, thereby resulting in a poor dynamic temperature distribution within the combustion chamber 34, which in turn exacerbates amplification of the combustion noise level.

The inventor has found that improvement can be achieved if the acoustic and hydraulic fluctuation components of the compressor air flow are decoupled before entry into the combustor. Hence, in one aspect, the invention presents an aerodynamic trip to effect a decoupling of the acoustic and hydraulic fluctuation components of the compressor air flow, as will now be described in more detail.

Figure 3:
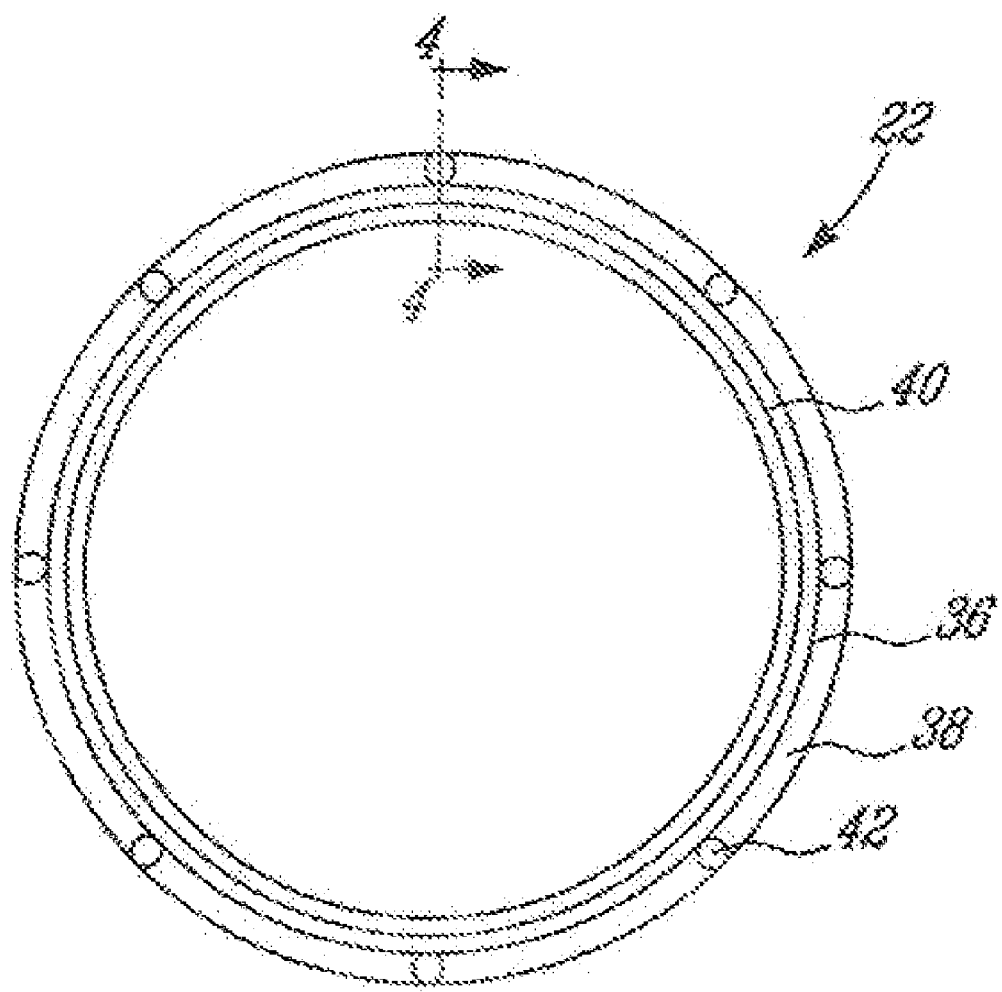
FIG. 3 is a front elevational view of an aerodynamic trip ring of FIG. 2.
Figures 4, 4A:
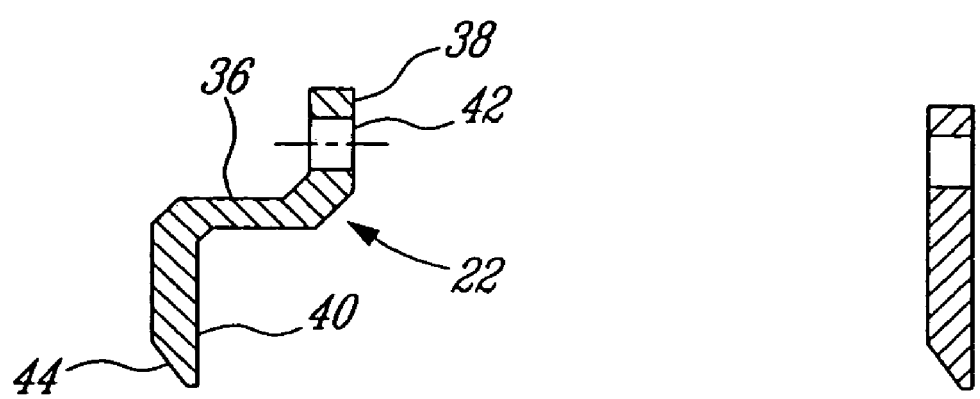
FIG. 4 is a cross-sectional view taken along Line 4-4 of FIG. 3.
FIG. 4a is a cross-sectional view similar to FIG. 4 or an alternate embodiment.

The aerodynamic trip ring 22 more clearly shown in FIGS. 3 and 4, is made of, for example, a suitable metal material or any other material suitable for the application and subject operating conditions, and includes a mounting portion including an axial section 36 and an outer radial section 38, and an inner radial trip section 40. The outer radial section 38 extends radially outwardly from the axial section 36 at one side thereof, and the inner radial section 40 extends radially inwardly from the axial section 36 at the other side thereof. A plurality of mounting openings 42 are provided in the outer radial section 38 in a circumferentially spaced apart relationship. The inner radial section 40 preferably includes an inner periphery 44 beveled at the outer side thereof.

Referring to FIGS. 2-4, the casing 26 of a gas turbine engine is configured with an upstream section 46 and a downstream section 48 which are bolted together by a flange connection 50. In such a situation, the aerodynamic trip ring 22 is preferably secured to the inner side of the casing 26 by positioning the outer radial section 38 between the upstream and the downstream sections 47, 48 of the casing 26, and by receiving the flange connection bolts (not indicated) extending through the mounting openings 42. The axial section 36 of the aerodynamic trip ring 22 preferably has a radial dimension appropriate for abutting the inner side of the casing 26 in order to prevent the aerodynamic trip ring 22 from possible vibration caused by the effects of the fluctuation energy carried by the compressor air flow. The inner radial section 40 of the aerodynamic trip ring 22 extends into the flow path 46 of the compressor air flow within the chamber 28 downstream of the compressor diffuser 20. The beveled inner periphery 44 faces the compressor diffuser 20 when the aerodynamic trip ring 22 is mounted within the chamber 28.

In use, the aerodynamic trip ring 22 surrounding the annular combustor 24 imparts a perpendicular directional component to the compressor flow exiting the compressor and passing by the trip ring 22. The interaction of the air flow and the trip ring 22 creates a step change in the direction and pressure of the compressor air flow prior to entry of the air flow into the combustor 24, which beneficially improves both temperature distribution in the combustion and combustion noise levels in the combustor.

The trip creates a step change in a direction of at least a portion of the compressor air flow which is believed to thereby diffuse the hydraulic fluctuation energy in the compressor air flow. Diffusion of this energy promotes redistribution of compressor air around the combustor 24 promotes better air distribution uniformity inside the combustion chamber 34, thereby resulting in better a mixing of the air and the fuel. Thus, the overall temperature distribution factor (OTDF) of the gas turbine engine combustion can be improved. The trip also causes a step change increase in the pressure drop in the air flow which, together with the direction change, results in an energy dissipation which is useful, when controlled according to the present teachings, in attenuating combustion noise. In general terms, the longer at least a portion of the compressor air flow remains in the chamber 28 before entering the combustor, the better decoupling of the acoustic and hydraulic fluctuation components of the compressor air flow can be achieved as a result of a time delay and phase shift on all frequency ranges in the air flow. The local pressure drop around the combustor may therefore be beneficially redistributed, and the duration the compressor air flow resides within the chamber outside the combustor may be beneficially altered to permit the fluctuation components of the compressor air flow to be decoupled so that a subtractive cancelling effect on combustion noise is achieved in the combustor. The present invention therefore achieves a beneficial decoupling of compressor acoustic and hydrodynamic fluctuations prior to entry into the combustor.

The step change in direction is achieved by a redirecting function performed by the trip. The step change pressure drop is achieved by one or more of a flow restricting function, a turbulence intensity increasing function and flow separation function of the trip. All elements contribute to an energy dissipation in the flow, and a corresponding frequency shift in the flow's acoustic and hydraulic components. It will be understood that a step change is not a continuous change over a distance travelled by the air flow, but rather a discontinuity in direction and or pressure drop.

The configuration, size and location of the trip can be determined depending on the desired direction change and desired pressure drop to achieve the desired percentage of air redistribution around the combustor. The redistribution preferably occurs upstream of air entry into the combustor and downstream of the inlet into the chamber. The trip is preferably placed at a reasonable distance, downstream so as not to cause choking, etc. The trip is preferably located close to the compressor outlet relative to the size of the chamber 28. The trip is placed relative to the compressor outlet to restructure the flow exiting the compressor before that flow enters the combustor. For example, referring to FIG. 2, trip 22 nay be designed to cause 10% more air to be redistributed towards the inner wall of the annular combustor (i.e. the lower wall, as depicted in FIG. 2), which may thereby achieve a better pressure distribution about the combustor, achieve a desired frequency shift in the flow, etc.

Fuel or partial redistribution of air flow velocity and pressure and diffusion of fluctuation energy in the air flow are thus both achieved by introducing a step change in velocity and pressure to the air flow. The hydrodynamic and acoustic structure imposed by the compressor on the air flow can be restructured according to the designer's preference prior to delivery to the combustor for combustion. The invention therefore permits combustor noise and combustion performance to be improved for a given combustor and fuel nozzle configuration without making changes to the combustor and/or fuel nozzle configuration. This permits the designed to optimize those components according to another set considerations.

Preferably, the pressure drop introduced by the trip will be not more than the pressure drop which is calculated to occur across the combustor in the same system operated without the trip present. The pressure drop selected by the designed will preferably range between 0 and this preferred maximum value.

The use of the aerodynamic trip approach to affect the compressor air flow within the chamber 28 is a simple, convenient and practical approach executable entirely outside, the combustor 24. The "tripped" compressor air flow permits a better temperature distribution and a relatively lower noise energy to be delivered to the combustion chamber 34, and thereby permits the overall acoustic noise level of the gas turbine engine combustion to be intentionally and controllably reduced relative to prior art "untripped", flows.

The aerodynamic trip 22 may be secured to engine 10 using any suitable mounting means. For example, an aerodynamic trip ring 22 may include a mounting portion with only, the axial section 36 for mounting the inner radial trip section 40 to the engine. The mounting holes 42 or other mounting means may be defined in the axial section 36 of the mounting portion so that the aerodynamic trip ring 22 may be mechanically mounted directly to the inner side of the casing 22 at any selected axial position between compressor diffuser 20 and the support structure 30. In such a configuration, the radial size of the axial section 36 should be properly fitted into an inner diameter of the casing 26. Any other suitable manner of mounting or mounting configuration may be likewise be used, such chemical bonding, welding, brazing, interlocking or other mechanical attachment or the feature may be integrally provided on an existing component.

Figure 5A:
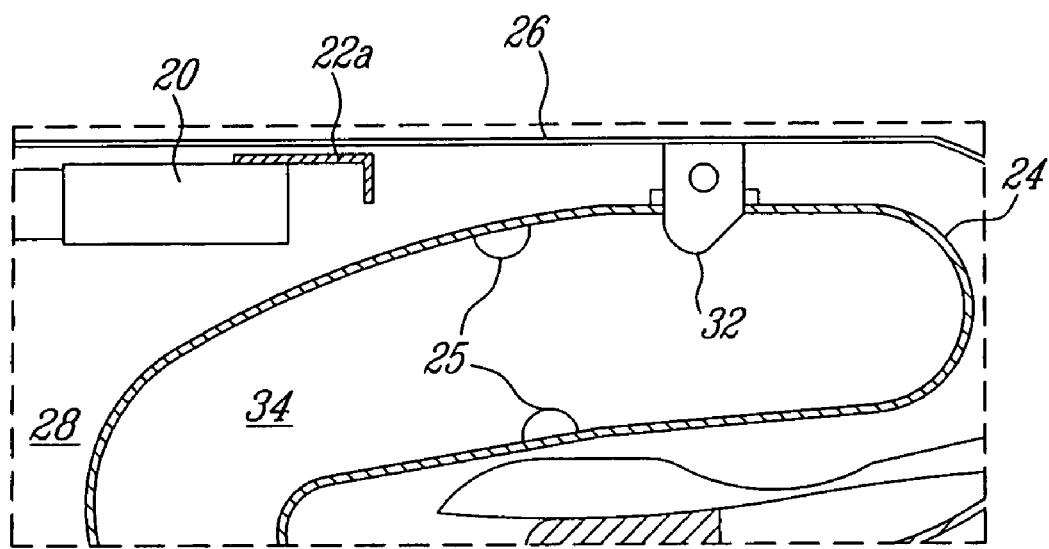
FIGS. 5a and 5b depict another alternate embodiment of the invention.
Figure 5B:
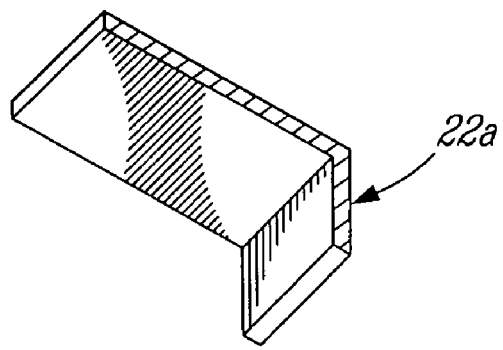
Figure 6A:
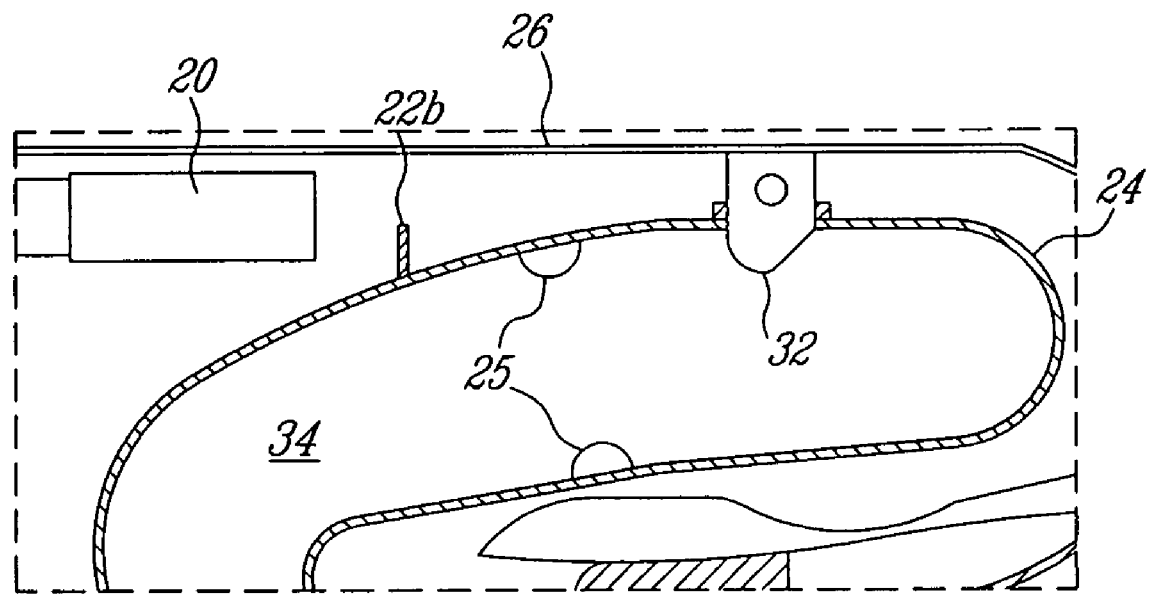
FIGS. 6a and 6b depict a further alternate embodiment of the invention.
Figure 6B:
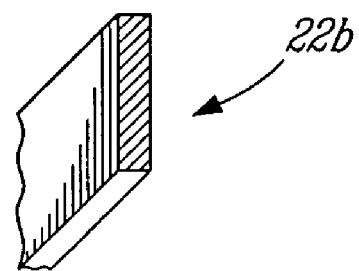
Figure 7A:
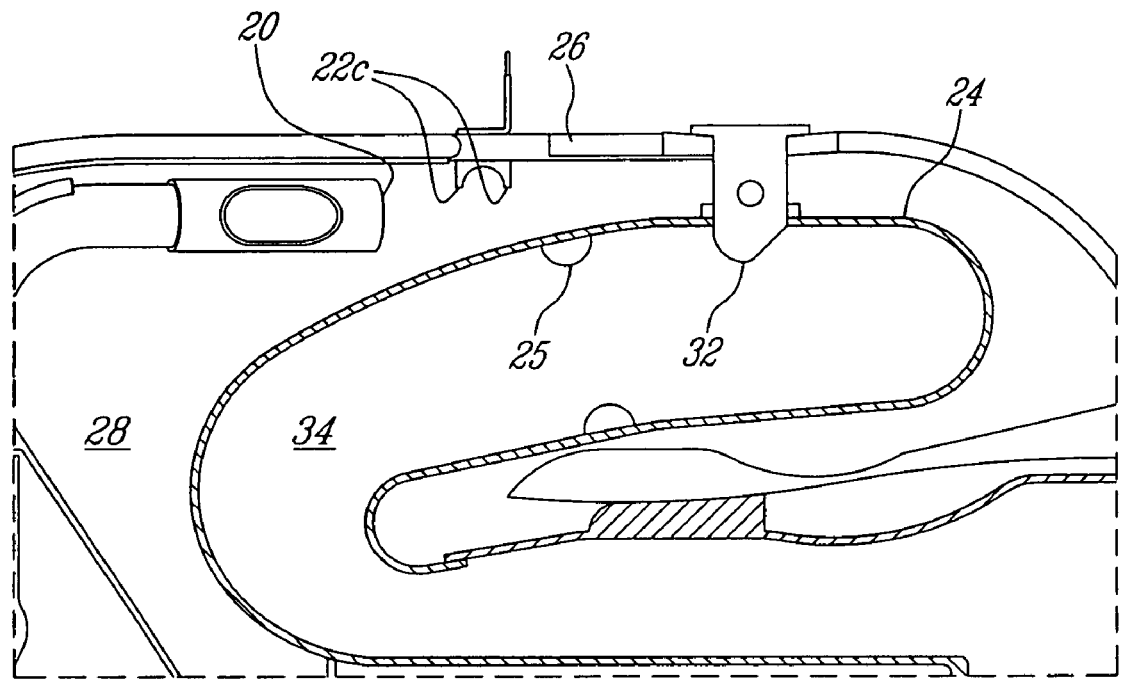
FIGS. 7a and 7b depict another embodiment of the invention.
Figure 7B:
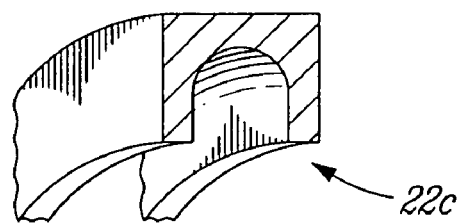

The trip means is positioned fluidly intermediate the compressor and the combustor. The trip means may be mounted to the casing 26, the combustor 24, the support structure 30, the compressor diffuser 20, or other suitable location. Likewise, the trip need not be continuous or uniform around the combustor. For example, referring to FIGS. 5a and 5b, a non-continuous non-ring-like trip means 22, particularly a plurality of baffle plates 22a, which may be provided with or without openings (without is shown), and which may be placed in the flow path 46 of the compressor air flow, mounted to the compressor diffuser 20. In another example shown in FIGS. 6a and 6b, trip means 22 may be a plurality of deflector members 22b mounted to the combustor. Referring to FIGS. 7a and 7b, trip means 22 may comprise multiple elements 22c extending into the flow path downstream of one another, etc.

This, description is intended to be exemplary only and is not exhaustive with respect to possible variation of the present invention. While it is preferable to provide the trip means substantially entirely around the combustor 24 for substantially circumferentially uniformly affecting the compressor air flow, it is not necessary to achieve benefits as described herein. Multiple trips having different configurations may be used, according to preference. Any device, structure or mechanism which performs a function like that described may be used, and the invention is not limited to a conventional trip, per se. The present invention can be used with any compressor configuration (e.g. centrifugal, axial, etc.) or any other means by which a flow of preferably compressed combustion air is provided to an volume of air enveloping a combustor. Any combustor type, including can, cannular and annular type combustors, may be used. The volume or air around the combustor need not completely encircle or surround the combustor. The trip means is preferably arranged transversely relative to the original air flow outside the combustor, but need not be necessarily so. The trip means need not extend perpendicularly to the flow or radially relative to the engine centreline, those these are, preferred by the inventor. The present approach may also be used advantageously to decouple imposed instabilities such as that which may arise from any feedback loop between imposed pressure oscillations by the compressor and fluctuation of combustor equivalence ratio or heat dissipation rate. Modifications and improvements to the above-described embodiments of the present invention may therefore become apparent to those skilled in the art, and thus the foregoing description is intended to be exemplary rather than limiting. The scope of the present invention is therefore intended to be limited solely by the scope of the appended claims.

I claim:

1. A gas turbine engine comprising:
   a combustor portion including at least one combustor, the combustor having a plurality of holes therein for admitting combustion air into the combustor;
   a casing defining at least one chamber therein, the chamber containing the combustor and a volume of air around at least a portion of the combustor;
   a compressor portion communicating with the chamber via a compressor diffuser outlet for delivering compressed air to the chamber for subsequent admission into the combustor; and
   a ring extending into the chamber substantially continuously around the chamber so as to extend partially into an air flow exiting the compressor diffuser outlet into the chamber, the ring sized and positioned in the chamber to cause a step change in direction and pressure of at least a portion of the air flow, the step change adapted to effect a redistribution of air around the combustor to thereby achieve at least one of reduced combustion noise and more uniform temperature distribution in the combustor.

2. The gas turbine engine of claim 1, wherein the step change in pressure is a pressure drop not greater than an air flow pressure drop calculated to occur across the combustor in an equivalent gas turbine engine, the equivalent gas turbine being identical to the gas turbine engine except equivalent gas turbine is without a ring of the type claimed in claim 1.

3. The gas turbine engine of claim 1, wherein the ring extends from a wall of the chamber.

4. The gas turbine engine of claim 1, wherein the ring extends substantially radially into the air flow.

5. The gas turbine engine of claim 1, wherein the ring includes a bevelled inner periphery on a side facing the compressor outlet.

6. The gas turbine engine of claim 1, wherein the ring is secured between an upstream section and a downstream section of the casing.

7. The gas turbine engine of claim 1, wherein the ring is disposed in the chamber so as to be closer to the compressor outlet than it is to substantially all of said holes in the combustor.

8. An apparatus for improving combustion in a gas turbine engine, the gas turbine engine comprising at least a compressor portion, a combustor and a chamber housing the combustor, the compressor portion having a compressor diffuser outlet interfacing with the chamber for delivering a flow of compressed air to the chamber, the combustor having holes therein interfacing with the chamber and adapted to permit air in the chamber to enter the combustor for combustion, the apparatus comprising:
   means positioned fluidly intermediate the compressor diffuser outlet and the combustor extending partially into the compressed air flow exiting the compressor diffuser outlet for aerodynamically tripping the compressed air flow entering the chamber to thereby create a step change in the air flow prior to entry into the combustor, said means adapted to thereby decouple acoustic and hydraulic fluctuation components in the air flow prior to entry of the air flow into the combustor.

9. The apparatus of claim 8, wherein step change is at least one of a direction change and an increase in pressure drop.

10. The apparatus of claim 8, wherein the means for aerodynamically tripping the air flow extends partially into the air flow.

11. A gas turbine engine comprising:
    a gas generator portion including at least a compressor diffuser, a combustor and a chamber around the combustor, the gas generator portion in use having an air flow from the compressor diffuser entering the chamber and guided thereby to the combustor, the air flow providing a source of combustion air to the combustor; and
    at least one trip disposed in the chamber at a location fluidly intermediate the compressor diffuser and the combustor, the trip extending into the air flow substantially transversely relative to an initial direction of the air flow in the chamber, the trip adapted in use to create a predetermined step change increase in pressure drop of the air flow to thereby effect a predetermined air flow redistribution in the chamber, said air flow redistribution predetermined to improve at least one of an air pressure distribution outside the combustor and a fluctuation phase shift in the air flow adapted to reduce combustion noise.

12. The gas turbine engine of claim 11, wherein the step change increase in pressure drop is not greater than a predetermined pressure drop, the predetermined pressure drop being equivalent to a pressure drop in the air flow caused by the combustor in the same gas turbine engine when the gas turbine is operated without the at least one trip.

13. The gas turbine engine of claim 11, wherein the air flow redistribution comprises a redistribution of local pressure drop around the combustor.

14. The gas turbine engine of claim 11, wherein the air flow redistribution comprises a redistribution of air flow around the combustor.

15. The gas turbine engine of claim 11, wherein the air flow redistribution is adapted to decouple pressure fluctuations in the air flow prior to entry of the air flow into the combustor.

16. The gas turbine engine of claim 11, wherein the air flow redistribution is adapted to redirect a greater portion of the air flow towards a radially inner side of the combustor.

17. The gas turbine engine of claim 11, wherein the at least one trip extends into the chamber from an inner side of a radially outer wall of the chamber.

18. A method for improving at least one of a temperature distribution and a combustion noise level in a combustor of a combustion system, the combustion system having an air source for providing a flow of compressed air to a chamber housing the combustor, the combustor having holes therein for admitting the compressed air into the combustor for combustion therein when mixed with fuel and ignited, the method comprising the step of:

aerodynamically tripping the flow of compressed air downstream of an entry point for said air into the chamber and before the flow of air enters the combustor, the step of tripping adapted to impart at least a step change in pressure drop of at least a portion of the flow of air, the step change adapted to decouple fluctuation components in the flow of air prior to entry of the air into the combustor.

19. A method of providing a gas turbine engine, the method comprising the steps of:

determining a configuration for a compressed air system, a combustor and a casing chamber surrounding the combustor, the configuration including an air flow path from compressed air system through the casing chamber and into the combustor;

determining an initial operating air pressure distribution occurring in the compressed air in the chamber around the combustor;

determining a desired air pressure redistribution in the compressed air in the chamber around the combustor, the redistribution adapted to provide at least one of reduced combustion noise and improved temperature distribution in the combustor; and introducing an intervention in the casing chamber, the intervention extending into the flow path and adapted to effect the determined air pressure redistribution.

20. The method of claim 19, wherein the intervention causes a step change in air delivered from the compressed air system to casing chamber.

21. The method of claim 19, wherein the step change includes a discontinuous increase in pressure drop.

22. The method of claim 21, wherein the increase in pressure drop is not greater than a calculated pressure drop across a combustor in a comparable gas turbine engine, the comparable gas turbine engine being free from said intervention in the casing chamber.

23. A method of improving combustion, the method comprising the steps of:

providing a compressed air flow, the compressed air flow having an acoustic and hydrodynamic structure imposed during a compression process;

restructuring the acoustic and hydrodynamic structure to provide a preselected second acoustic and hydrodynamic structure, the second structure preselected to cause an acoustic and hydrodynamic phase shift in at least a portion of the compressed air flow, the phase shift being selected and adapted to reduce combustion noise;

providing the restructured compressed air flow to a combustor for use in combustion.

24. A method of improving combustion in a gas turbine engine, the method comprising the steps of:

selecting a gas turbine engine, the engine having at least a compressor providing a source of compressed air, a combustor and a chamber surrounding the combustor, the compressor, chamber and combustor in serial fluid communication for transmitting the air from the compressor to the combustor for combustion; and modifying the gas turbine engine by inserting at least one aerodynamic trip into the chamber, the trip adapted to effect at least one of a pressure redistribution around the combustor and a phase shift in pressure fluctuations in at least a portion of the air in the chamber, the phase shift adapted to reduce combustion noise.

* * * * *